(12) United States Patent
Warren et al.

(10) Patent No.: US 8,074,324 B2
(45) Date of Patent: *Dec. 13, 2011

(54) FLEXIBLE, DEPLOYMENT RATE DAMPED HINGE

(75) Inventors: Peter A. Warren, Newton, MA (US); John Williams, Maynard, MA (US); Victor Leemon, Mansfield, MA (US); Michael Winter, Billerica, MA (US)

(73) Assignee: Foster-Miller, Inc., Waltham, MA (US)

( * ) Notice: Subject to any disclaimer, the term of this patent is extended or adjusted under 35 U.S.C. 154(b) by 726 days.

This patent is subject to a terminal disclaimer.

(21) Appl. No.: 10/891,907

(22) Filed: Jul. 15, 2004

(65) Prior Publication Data

US 2005/0022465 A1 Feb. 3, 2005

Related U.S. Application Data

(60) Continuation-in-part of application No. 10/188,721, filed on Jul. 2, 2002, which is a continuation-in-part of application No. 10/044,434, filed on Jan. 11, 2002, now abandoned, which is a division of application No. 09/436,514, filed on Nov. 9, 1999, now Pat. No. 6,374,565.

(51) Int. Cl.
*E05D 5/00* (2006.01)
*E05D 1/00* (2006.01)

(52) U.S. Cl. ............... 16/372; 16/225; 16/385; 52/108; 52/645; 52/646; 52/655.1

(58) Field of Classification Search ............... 16/372, 16/373, 385, 388, 225–227; 403/286, 291, 403/220, 209; 267/292, 294; 52/653.1, 653.2, 52/641, 651.02, 102; 138/119
See application file for complete search history.

(56) References Cited

U.S. PATENT DOCUMENTS

| | | |
|---|---|---|
| 187,078 A | 2/1877 | Adams |
| 280,186 A | 6/1883 | Johnston |
| 940,399 A | 11/1909 | Mueser |
| 1,026,801 A | 5/1912 | Haase |
| 1,135,809 A | 4/1915 | Jones |
| 1,377,101 A | 5/1921 | Sparling |
| 1,486,414 A | 3/1924 | Brier |
| 1,769,967 A | 7/1930 | Saurman et al. |

(Continued)

FOREIGN PATENT DOCUMENTS

JP 61-43579 9/1986

(Continued)

OTHER PUBLICATIONS

Jensen, David W., "*A Glimpse Into the World of Innovative Composite IsoTruss™ Grid Structures*", SAMPE J., vol. 36, No. 5, pp. 8-16 (Sep./Oct. 2000).

(Continued)

*Primary Examiner* — Victor Batson
*Assistant Examiner* — Matthew Sullivan
(74) *Attorney, Agent, or Firm* — Iandiorio Teska & Coleman

(57) ABSTRACT

A flexible hinge including a first set of plies and a second set of plies, and a hinge area where the first set of plies and the second set of plies bend. A damping material is disposed between plies of the first set and the second set at least at the hinge area thereof to control the deployment of the hinge.

4 Claims, 20 Drawing Sheets

U.S. PATENT DOCUMENTS

| | | | |
|---|---|---|---|
| 1,925,617 A * | 9/1933 | Warren | 403/209 |
| 1,971,500 A | 8/1934 | Palmer | |
| 1,981,938 A | 11/1934 | Anderson | |
| 2,071,270 A * | 2/1937 | Dellinger | 403/28 |
| 2,210,833 A | 8/1940 | Clough | |
| 2,266,214 A | 12/1941 | Kellems | |
| 2,461,916 A | 2/1949 | Omar | |
| 2,474,431 A | 6/1949 | Lipman et al. | |
| 2,491,693 A | 12/1949 | Sivertsen | |
| 2,559,951 A * | 7/1951 | Dunbar et al. | 280/659 |
| 2,695,795 A | 11/1954 | Tamminga | |
| 2,836,447 A | 5/1958 | Wright | |
| 2,905,282 A | 9/1959 | Miller | |
| 2,960,924 A | 11/1960 | Grott | |
| 2,986,417 A | 5/1961 | Baker | |
| 2,989,324 A | 6/1961 | O'Halloran | |
| 3,035,708 A | 5/1962 | Freeman | |
| 3,166,319 A | 1/1965 | Brilhart | |
| 3,277,555 A * | 10/1966 | Kutash | 29/898.042 |
| 3,326,497 A | 6/1967 | Michelson | |
| 3,353,599 A | 11/1967 | Swift | |
| 3,357,457 A | 12/1967 | Myer | |
| 3,367,604 A | 2/1968 | Matteo | |
| 3,371,647 A | 3/1968 | Shopbell | |
| 3,380,097 A | 4/1968 | Pharris | |
| 3,381,986 A | 5/1968 | Seelig | |
| 3,386,128 A * | 6/1968 | Vyvyan | 16/225 |
| 3,459,391 A | 8/1969 | Haynos | |
| 3,460,992 A | 8/1969 | Avilov et al. | |
| 3,473,758 A | 10/1969 | Webb | |
| 3,474,488 A * | 10/1969 | Kruzich | 16/225 |
| 3,477,662 A | 11/1969 | Anderson | |
| 3,503,164 A | 3/1970 | Berry et al. | |
| 3,612,287 A | 10/1971 | Maltese | |
| 3,652,935 A | 3/1972 | Shaw | |
| 3,670,358 A * | 6/1972 | Schwartz et al. | 16/225 |
| 3,677,508 A | 7/1972 | Dillard et al. | |
| 3,690,080 A | 9/1972 | Dillard | |
| 3,691,705 A * | 9/1972 | Luckey | 52/108 |
| 3,707,304 A | 12/1972 | Gostling | |
| 3,730,509 A * | 5/1973 | Jorn | 267/152 |
| 3,733,758 A | 5/1973 | Maier et al. | |
| 3,749,133 A | 7/1973 | Bochory | |
| 3,751,748 A | 8/1973 | Roe et al. | |
| 3,757,476 A | 9/1973 | Schoen | |
| 3,776,549 A | 12/1973 | Ganis | |
| 3,807,029 A * | 4/1974 | Troeger | 29/436 |
| 3,818,948 A | 6/1974 | Hedges | |
| 3,823,747 A | 7/1974 | Dembiak et al. | |
| 3,836,979 A | 9/1974 | Kurland et al. | |
| 3,873,077 A * | 3/1975 | Jorn | 267/152 |
| 3,875,711 A | 4/1975 | Palmer | |
| RE28,672 E | 1/1976 | Wakeman | |
| 4,030,102 A | 6/1977 | Kaplan et al. | |
| 4,032,125 A * | 6/1977 | Minakawa et al. | 267/294 |
| 4,032,248 A | 6/1977 | Parduhn et al. | |
| 4,068,238 A | 1/1978 | Acker | |
| 4,078,867 A | 3/1978 | Ronden | |
| 4,131,701 A | 12/1978 | VanAuken | |
| 4,137,686 A | 2/1979 | Kern | |
| 4,145,765 A | 3/1979 | Malone | |
| 4,148,163 A | 4/1979 | Chenin et al. | |
| 4,162,566 A | 7/1979 | Webb | |
| 4,163,303 A | 8/1979 | Hanna | |
| 4,214,932 A | 7/1980 | VanAuken | |
| 4,243,075 A | 1/1981 | McPherson et al. | |
| 4,250,679 A | 2/1981 | Burg | |
| 4,259,821 A | 4/1981 | Bush | |
| 4,266,578 A | 5/1981 | Swain et al. | |
| 4,289,553 A | 9/1981 | Nolf | |
| 4,334,391 A | 6/1982 | Hedgepeth et al. | |
| 4,365,908 A | 12/1982 | Thiboutot | |
| 4,384,163 A | 5/1983 | Rauschenbach et al. | |
| 4,417,427 A * | 11/1983 | Bschorr | 52/167.1 |
| 4,446,662 A | 5/1984 | Humphries | |
| 4,453,353 A | 6/1984 | Killop et al. | |
| 4,480,415 A | 11/1984 | Truss | |
| 4,488,282 A * | 12/1984 | Chung | 369/135 |
| 4,498,938 A | 2/1985 | Moisson et al. | |
| 4,532,742 A | 8/1985 | Miura | |
| 4,543,998 A | 10/1985 | Thomerson | |
| 4,558,911 A | 12/1985 | Ruoff | |
| 4,574,553 A | 3/1986 | Lisec | |
| 4,579,302 A | 4/1986 | Schneider et al. | |
| 4,587,777 A | 5/1986 | Vasques et al. | |
| 4,599,012 A | 7/1986 | Kugler et al. | |
| 4,603,521 A | 8/1986 | Engelhart | |
| 4,603,737 A | 8/1986 | Spikes | |
| 4,611,946 A * | 9/1986 | Gebelius | 403/102 |
| 4,613,870 A | 9/1986 | Stonier | |
| 4,614,502 A | 9/1986 | Nelson | |
| 4,615,543 A | 10/1986 | Cannon | |
| 4,655,022 A | 4/1987 | Natori | |
| 4,662,130 A | 5/1987 | Miura et al. | |
| 4,666,107 A | 5/1987 | Berry | |
| 4,683,610 A | 8/1987 | Richards et al. | |
| 4,686,134 A | 8/1987 | Ono | |
| 4,723,579 A | 2/1988 | Hyodo et al. | |
| 4,729,807 A | 3/1988 | Hede et al. | |
| 4,778,184 A | 10/1988 | Fleischer | |
| 4,798,492 A | 1/1989 | Smith | |
| 4,848,954 A | 7/1989 | Wiseman | |
| 4,867,205 A | 9/1989 | Bournazel et al. | |
| 4,887,397 A | 12/1989 | Peterson | |
| 4,955,742 A | 9/1990 | Marks | |
| 4,958,474 A | 9/1990 | Adams | |
| 4,960,137 A | 10/1990 | Pott et al. | |
| 4,983,242 A * | 1/1991 | Reed | 156/172 |
| 5,016,374 A | 5/1991 | Engström | |
| 5,085,018 A | 2/1992 | Kitamura et al. | |
| 5,094,046 A | 3/1992 | Preiswerk | |
| 5,138,806 A | 8/1992 | Marx et al. | |
| 5,163,262 A | 11/1992 | Adams | |
| 5,167,160 A | 12/1992 | Hall, II | |
| 5,213,879 A * | 5/1993 | Niwa et al. | 428/213 |
| 5,228,644 A | 7/1993 | Garriott et al. | |
| 5,235,788 A | 8/1993 | Maimets | |
| 5,315,795 A | 5/1994 | Chae et al. | |
| 5,319,905 A | 6/1994 | Szirtes | |
| 5,328,732 A | 7/1994 | Renna | |
| 5,355,555 A | 10/1994 | Zarelius | |
| 5,366,012 A | 11/1994 | Lohbeck | |
| 5,380,131 A | 1/1995 | Crawford | |
| 5,381,782 A | 1/1995 | DelaRama et al. | |
| 5,390,463 A | 2/1995 | Sollner | |
| 5,402,830 A | 4/1995 | Dortzbach | |
| 5,431,508 A | 7/1995 | Kitamura | |
| 5,439,311 A | 8/1995 | Hughes, Jr. | |
| 5,494,378 A | 2/1996 | Hanson | |
| 5,499,661 A | 3/1996 | Odru et al. | |
| 5,520,476 A | 5/1996 | Marks et al. | |
| 5,520,747 A | 5/1996 | Marks | |
| 5,538,769 A | 7/1996 | Sandman, Jr. | |
| 5,556,677 A * | 9/1996 | Quigley et al. | 428/36.2 |
| 5,598,598 A | 2/1997 | Sorenson | |
| 5,615,968 A | 4/1997 | Verenski et al. | |
| 5,664,380 A | 9/1997 | Hsueh | |
| 5,680,145 A | 10/1997 | Thomson et al. | |
| 5,720,452 A | 2/1998 | Mutschler, Jr. | |
| 5,785,280 A | 7/1998 | Baghdasarian | |
| 5,804,277 A | 9/1998 | Ashbee | |
| 5,833,176 A | 11/1998 | Rubin et al. | |
| 5,857,648 A | 1/1999 | Dailey et al. | |
| 5,874,133 A | 2/1999 | Cochran | |
| 5,895,013 A * | 4/1999 | Towfiq | 244/119 |
| 5,921,048 A | 7/1999 | Francom et al. | |
| 5,924,745 A | 7/1999 | Campbell | |
| 5,977,932 A | 11/1999 | Robinson | |
| 5,984,568 A | 11/1999 | Lohbeck | |
| 6,004,639 A | 12/1999 | Quigley et al. | |
| 6,012,522 A | 1/2000 | Donnelly et al. | |
| 6,013,890 A | 1/2000 | Hulsizer | |
| 6,016,848 A | 1/2000 | Egres, Jr. | |
| 6,028,570 A | 2/2000 | Gilger et al. | |
| 6,065,500 A | 5/2000 | Metcalfe | |
| 6,102,339 A | 8/2000 | Wu et al. | |
| 6,104,358 A * | 8/2000 | Parker et al. | 343/915 |

| | | | |
|---|---|---|---|
| 6,132,882 A * | 10/2000 | Landin et al. ............... 428/437 |
| 6,135,030 A | 10/2000 | Besaw |
| 6,168,116 B1 | 1/2001 | Renshall et al. |
| 6,175,989 B1 * | 1/2001 | Carpenter et al. ............ 16/225 |
| 6,178,702 B1 | 1/2001 | Hand et al. |
| 6,188,168 B1 * | 2/2001 | Han et al. .................... 313/405 |
| 6,217,975 B1 | 4/2001 | Daton-Lovett |
| 6,273,634 B1 | 8/2001 | Lohbeck |
| 6,302,277 B1 | 10/2001 | Resh |
| 6,321,503 B1 | 11/2001 | Warren |
| 6,334,235 B2 * | 1/2002 | Duperray et al. ............ 16/225 |
| 6,343,442 B1 | 2/2002 | Marks |
| 6,343,511 B1 * | 2/2002 | Lynnworth et al. .......... 73/644 |
| 6,345,482 B1 | 2/2002 | Warren |
| 6,374,565 B1 | 4/2002 | Warren |
| 6,375,385 B1 | 4/2002 | Kennedy |
| 6,453,635 B1 | 9/2002 | Turner |
| 6,475,580 B1 | 11/2002 | Wright |
| 6,547,814 B2 | 4/2003 | Edwin et al. |
| 6,560,942 B2 | 5/2003 | Warren et al. |
| 2001/0010012 A1 | 7/2001 | Edwin et al. |
| 2002/0056248 A1 | 5/2002 | Warren |
| 2003/0019180 A1 | 1/2003 | Warren et al. |
| 2003/0182878 A1 | 10/2003 | Warren |
| 2003/0182879 A1 | 10/2003 | Warren |

FOREIGN PATENT DOCUMENTS

JP    2002-161650    6/2002

OTHER PUBLICATIONS

Mikulas, Martin M. Jr., "*Structural Efficiency of Long Lightly Loaded Truss and Isogrid Columns for Space Applications*", National Aeronautics and Space Administration Langley Research Center, Hampton, Virginia 23665, NASA Technical Memorandum 78687, pp. 1-27, Jul. 1978.

* cited by examiner

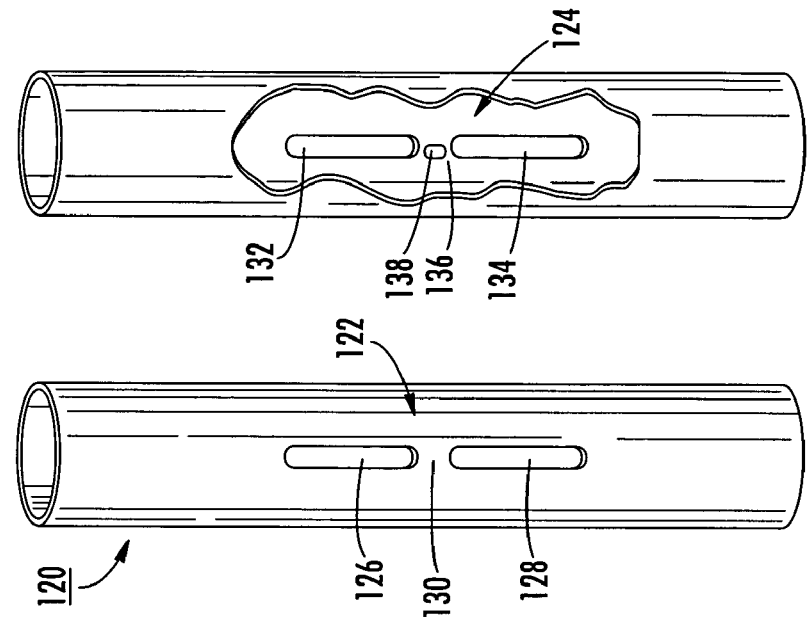
FIG. 10.
FIG. 11.
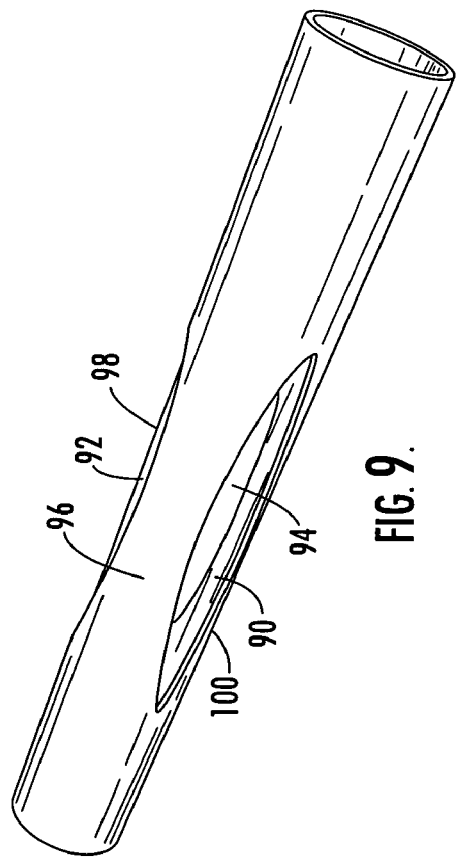
FIG. 9.

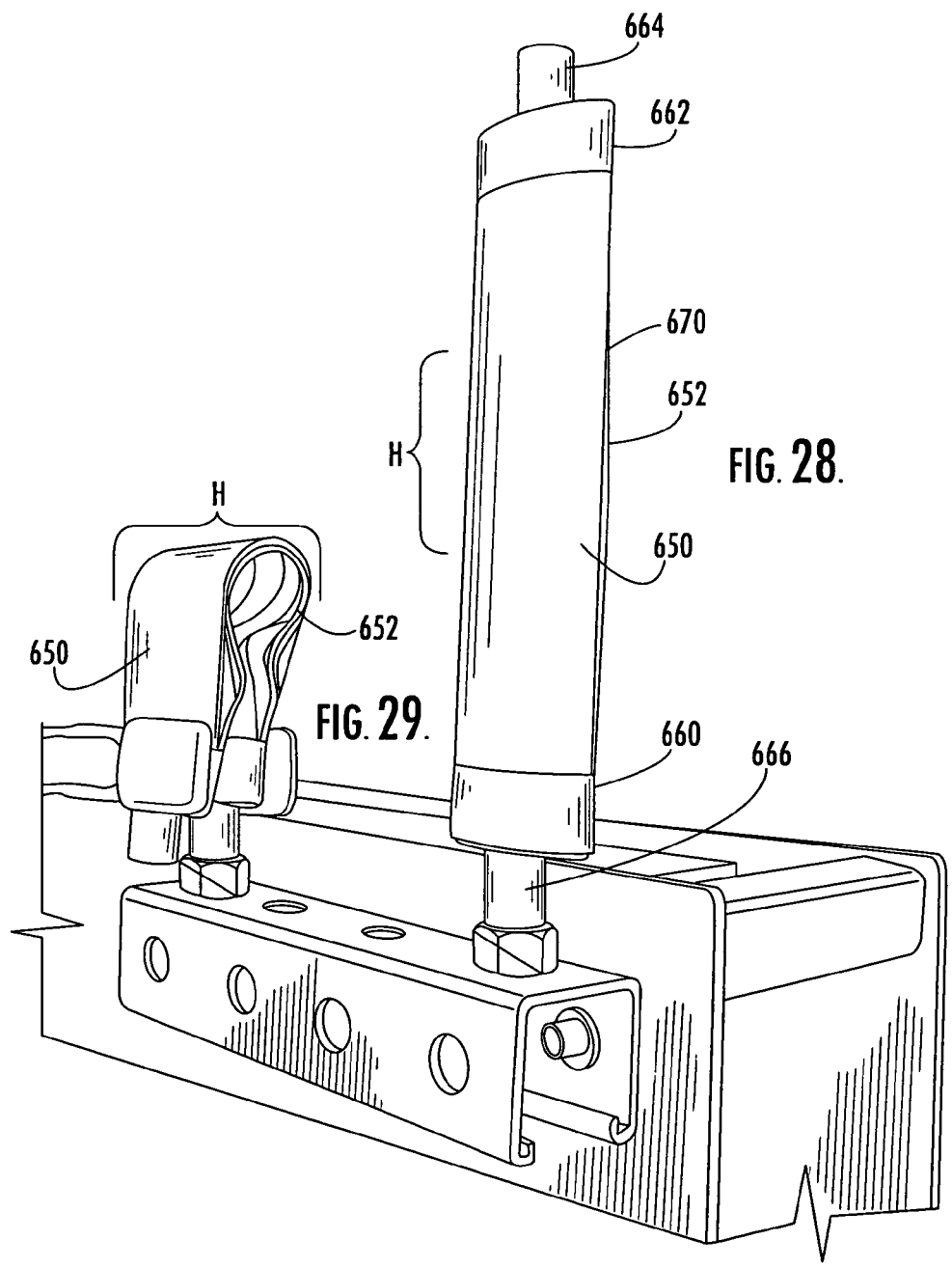

FLEXIBLE, DEPLOYMENT RATE DAMPED HINGE

RELATED PATENT APPLICATIONS

This application is a continuation-in-part application of patent application Ser. No. 10/188,721 filed Jul. 2, 2002 entitled "Foldable Member" which is a continuation-in-part application of patent application Ser. No. 10/044,434 filed Jan. 11, 2002 now abandoned entitled "Foldable Member", which is a divisional application of application Ser. No. 09/436,514 filed Nov. 9, 1999 now U.S. Pat. No. 6,374,565 entitled "Foldable Member" now U.S. Pat. No. 6,374,565. This application is also related to U.S. Pat. No. 6,321,503.

FIELD OF THE INVENTION

This invention relates to a foldable boom, truss, or longeron member, collapsible truss structures and other similar structures made of such members and in particular, a flexible, rate damped deployable hinge for such structures and members.

BACKGROUND OF THE INVENTION

Key optical components of large aperture, space based optical instruments may be deployed on orbit to provide an aperture large enough to increase the resolution and optical performance by several orders of magnitude. The performance of such instruments depends on maintaining the precision and stability of the deployed structural geometry to within nanometers of an ideal shape. Nonlinear contact mechanics and freedom in the components of deployed structures mean that deployed instruments will have the capacity to change shape at the micron and nanometer level of resolution. Eliminating such nonlinearities as load path friction and freeplay would enable a deployed structure to be as linear and precise as a monolithic block of material.

In most mechanically deployed structures, components are moved from their stored positions into their final operational positions by some type of actuator and then locked into place with a deployment latch. For high precision structures, it is critical that the load paths and load predictable for the reliable operation of the instrument.

Existing deployable structure joints have several limitations that either completely prevent them from being used in high precision deployable instruments or require complex analysis and additional launch mass to provide deployment actuation and post deployment locking. Hinge joints previously used in moderate precision structures have relied on high levels of preload and friction to eliminate freeplay and geometric ambiguity. These joints have been shown to be unstable at the micron level, causing the structure to "microlurch" or change shape and thus move the instrument's optics far out of alignment.

Existing joints for precision space structures relied on high levels of preload between the many components to eliminate gaps and free play that cause inaccuracies in the structure. Unfortunately, these high levels of preload introduce correspondingly high levels of friction both during the deployment and after deployment has been completed. Friction mechanisms are nonlinear and thus are more difficult to control and less predictable.

Other hinge designs such as latch and actuator type systems suffer from the same disadvantages.

Recently, foldable truss members have been developed so that a truss structure can be collapsed and compactly packaged to save space during delivery and then released to expand and return to its original shape in orbit. All of these mechanisms add to the mass, expense and complexity of the structure and to the difficulty and expense of transporting it. These foldable members reduce the mass (and the delivery cost) of the structure by replacing the hinge, latch and actuator mechanisms with one single device. See, e.g., U.S. Pat. No. 4,334,391 incorporated herein by this reference.

Solid rods are joined on their ends forming a truss structure (a square frame for a solar panel array or a superstructure for a communications satellite antenna, for example) and preselected rods are cut in sections to form a hinge between the two sections. The rod sections are joined with spring steel elements similar to, if not actually, lengths of a carpenter's tape measure.

The rod sections can be folded with respect to each other by imparting a localized buckling force to one of the spring steel elements. Simply letting go of one rod section, returns the two rod sections to an end to end alignment due to the potential energy stored in the biased spring steel hinge elements.

In this way, a truss structure made up of several of these foldable rods can be designed on earth, collapsed for delivery to space, and then released once in position in space where the foldable rods flex back into position forming the truss structure designed and constructed on earth.

In use, this spring steel hinge design suffers from a number of shortcomings. First, hinges formed of spring steel elements require joining the ends of each spring steel element to a rod section. These joints and the spring steel elements themselves add significantly to the overall weight of the truss structure which is an undesired factor in space launch capability.

The spring steel elements also result in dimensionally unstable truss structures. The dimensional instability is caused by the relative motion of the internal components including the joints between the spring elements and the rod sections and permanent yielding of different areas of the spring elements themselves.

The result is that the shape of the truss structure may change when it is erected in space from the shape of the truss structure before it was collapsed on earth. This can have disastrous effects on instrument performance as even a ten nanometer to ten micrometer displacement can severely affect the performance of primary and secondary optics attached to the truss structure.

The inventors hereof have developed flexible material hinges or "strain-energy" hinges of various configurations which bend and fold and then, when released, automatically unfold. These types of hinges are used to fold and then deploy structures and structural system in which simplicity of operation and reliability of performance are greatly desired. Such systems have been used with great success in the deployment of spacecraft components such as solar arrays and antennae.

In traditional strain energy deployment, a flexible material such as a spring steel or thin fiber-reinforced plastic (composite) flexes to allow motion about a bending hinge line and is held in its stowed configuration until such time as deployment is desired. Once released, the stored strain energy in the flexed material provides the motive force to unfold the structure. In some systems, a lenticular or curved shape of flexing material is used so that once the flexing hinge straightens out, it locks into place with a curved shape that is significantly stronger in cross section than its bent, stowed shape.

Since the hinge is only flexing, there is no inherent friction to retard its deployment and, when such a folded hinge is released, the unfolding deployment action is very fast, almost violent.

Uncontrolled deployment of purely elastic systems results in extremely fast speeds at the end of deployment at latch-up that result in either excessive momentum loads being transferred into the structure, or an overload of the hinge as the momentum of the deployed article carries through to the latched hinge.

Existing solutions are either at the system level, providing mechanical restraint through a lanyard, or are at the material level, replacing the steel or composite hinge material with shape memory alloy or shape memory reinforced polymer. Both of these potential solutions have significant shortcomings that add to the overall weight and cost.

Mechanical restraint systems typically rely on a lanyard or linkage that connect the structure being deployed to an energy absorbing device such as an eddy current damper or visco-elastic damper. Devices such as these add to the mass and complexity of the overall system as well as complicating the kinematics of the deployment through the introduction of additional elements that must be managed and controlled.

Active materials such as shape memory alloys, shape memory plastics, and shape memory composites require the use of a heat source to raise their temperature above the phase change temperature. Once above the phase change temperature, the strain embedded in the material is released, causing actuation of the overall structure. However, the addition of the electrical components also adds to the cost and weight of the overall system and adds power, command and control requirements that previously did not exist. Additionally, active materials must make stiffness and density sacrifices in order to provide for the active material properties. The resulting mass and complexity additions reduce the advantages provided by the rate control inherent in the use of active materials.

SUMMARY OF THE INVENTION

It is therefore an object of this invention to provide a strain energy deployment hinge that is inherently passively damped so that its deployment rate is predictable and controlled.

It is a further object of this invention to provide a lightweight hinge that is of a single piece design.

It is a further object of this invention to provide a flexible hinge that has no residual strain upon deployment that would otherwise adversely affect the deployed precision.

It is a further object of this invention to provide such a flexible hinge which eliminates the need for deployment control mechanisms and mechanical restraining devices.

It is a further object of this invention to provide such a flexible hinge which is simple to manufacture and use.

It is a further object of this invention to provide such a flexible hinge which can be used in connection with foldable booms, trusses, longeron members, collapsible truss structures, and other similar structures made of such members.

The invention results from the realization that by adding a damping material between the plies of the hinge material, the deployment of the hinge is more predictable and controlled.

The subject invention, however, in other embodiments, need not achieve all these objectives and the claims hereof should not be limited to structures or methods capable of achieving these objectives.

This invention features a flexible hinge comprising a first set of plies, a second set of plies, a hinge area where the first set of plies bend and the second set of plies bend, and a damping material disposed between plies of the first set and the second set at least at the hinge area thereof to control the deployment of the hinge.

In one embodiment, the first and second set of plies may be made of composite material. The first and second set of plies may be curved inwardly towards each other. The first and second set of plies may be curved away from each other. The first and second set of plies may be curved in the same direction. At least one of the first and second set of plies may be flat. The first and second set of plies may be attached together at portions thereof on opposite sides of the hinge area. The first and second set of plies may be formed in a member including opposing elongated slots therethrough. The slots may be diametrically opposed. There may be opposing elongated sets of slots. The damping material may be solid, and may be a rubberized elastomer. The damping material may be a liquid when applied. The damping material may be viscous or viscoelastic. The damping material may be an epoxy.

This invention further features a flexible hinge including a plurality of sets of plies, a hinge area where each of the plurality of sets of plies bend, and a damping material disposed between plies of the plurality of sets at least at the hinge area thereof to damp the rate of deployment of the hinge.

In one embodiment, the plurality of sets of plies may be made of composite material. The plurality of sets of plies may be attached together at portions thereof on opposite sides of the hinge area. The plurality of sets of plies may be formed in a member including opposing elongated slots therethrough. The slots may be diametrically opposed. There may be opposing elongated sets of slots. The damping material may be solid, and may be a rubberized elastomer. The damping material may be a liquid when applied. The damping material may be viscous. The damping material may be visco-elastic. The damping material may be an epoxy.

This invention further features a flexible hinge including a plurality of plies, a hinge area where the plurality of plies bend, and a damping material disposed between at least one pair of adjacent plies at least at the hinge area thereof to damp the rate of deployment of the hinge.

In one embodiment, the plurality of sets of plies may be made of composite material. The plurality of sets of plies may be formed in a member including opposing elongated slots therethrough. The slots may be diametrically opposed. There may be opposing elongated sets of slots. The damping material may be solid, and may be a rubberized elastomer. The damping material may be a liquid when applied. The damping material may be viscous. The damping material may be visco-elastic. The damping material may be an epoxy.

BRIEF DESCRIPTION OF THE DRAWINGS

Other objects, features and advantages will occur to those skilled in the art from the following description of a preferred embodiment and the accompanying drawings, in which:

FIG. 9 is a front elevational view of another embodiment of the foldable member of this invention;

FIG. 10 is a side elevational view of another embodiment of the foldable member of the subject invention;

FIG. 11 is a view similar to FIG. 10 showing the interior rear side wall of the foldable member of the subject invention;

FIG. 28 is a schematic three-dimensional view showing an example of a flexible hinge in accordance with the subject invention in its deployed state;

FIG. 29 is a schematic three-dimensional view showing the flexible hinge of FIG. 28 in its folded configuration;

DISCLOSURE OF THE PREFERRED EMBODIMENT

Figure 3:
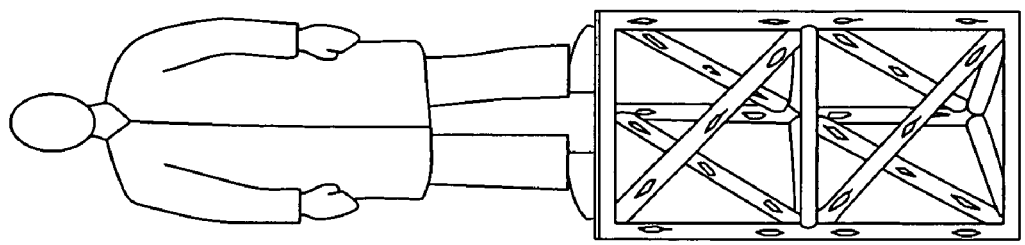
FIG. 3 is a perspective view of the structure of FIG. 2 after it expands from the collapsed condition.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Figure 1:
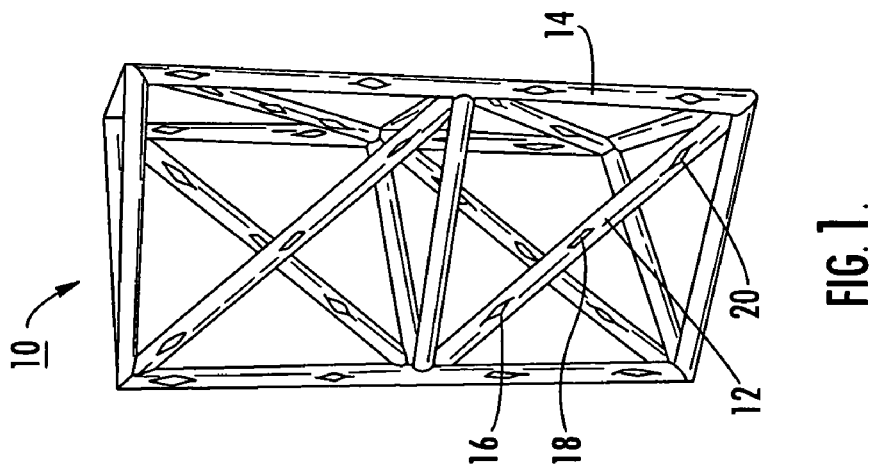
FIG. 1 is a perspective view of a structure made of a number of foldable members in accordance with the subject invention.

Truss structure 10, FIG. 1, of this invention includes a plurality of joined truss members 12 and 14 as shown. Truss structure 10, for example, may be 1.25 meters tall but collapsible to a height of 27 centimeters as shown in FIG. 2 due to the foldable nature of truss member 12 (and other selected truss members) which includes hinge areas 16, 18, and 20 along its length.

Depending on its specific design, hinge area 16 may fold downward, hinge area 20 may fold upward, and hinge area 18 may fold in the direction out of the plane of the drawing.

Figure 2:
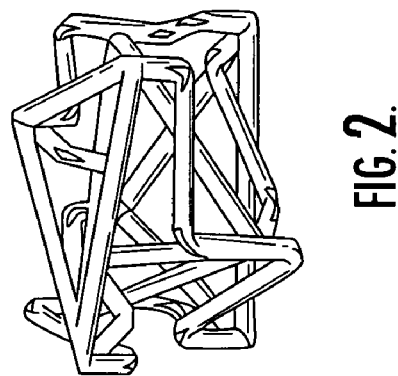
FIG. 2 is a schematic view of the structure shown in FIG. 1 in a collapsed state.

When collapsed as shown in FIG. 2, the volume of truss structure 10 is sharply reduced resulting in significant space savings for space flight.

Upon deployment in outer space, however, truss structure 10 automatically expands as shown in FIG. 3 to its original configuration and may be used as a frame for solar panels, various optical devices, or as a part of a superstructure when joined to similar structures.

As shown in FIG. 3, the truss structure is strong under compression and can support several hundred pounds. It is also strong against bending and torque since the individual hinge areas can only be actuated by intentional localized buckling force applied directly to the hinge areas.

Figure 4:
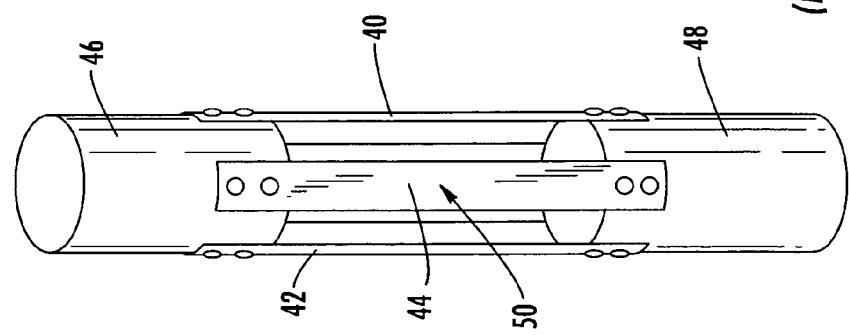
FIG. 4 is a front elevational view of a prior art foldable device.

In the prior art, hinges are formed in a truss member by cutting the truss members at the desired hinge area and attaching single clam shell shaped steel spring elements 40, 42, and 44, FIG. 4 to truss member sections 46 and 48.

Figure 5:
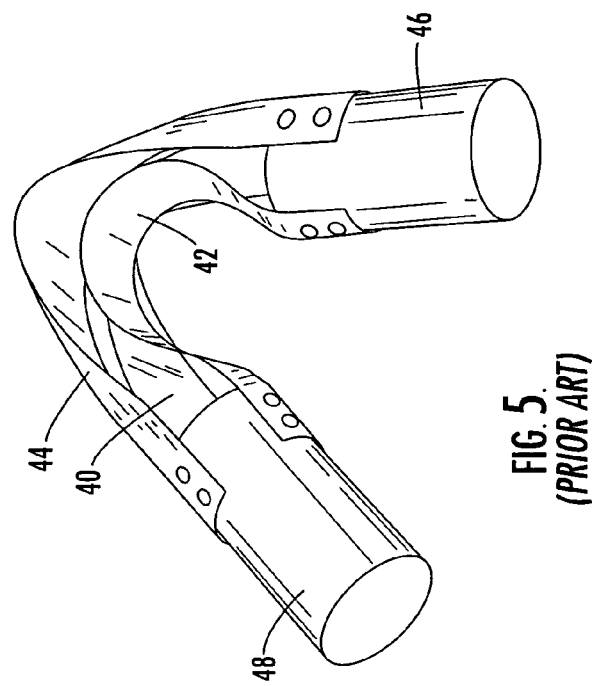
FIG. 5 is a view of the prior art device shown in FIG. 4 in the folded position.

The spring steel elements are similar to lengths of carpenter's tape from a tape measure. When a localized buckling force is imparted to one spring element as shown at 50 and the two truss member sections are subjected to a bending force, the spring elements readily bend, collapsing the truss member as shown in FIG. 5. If one truss member section is released, the clam shell shape of the spring steel elements spring the truss members into the configuration shown in FIG. 4.

However, these and other such truss members suffer from numerous shortcomings as discussed in the Background of the Invention above, including the fact that they are not thermally stable. Also, the joints between each spring steel element and the truss member sections can shift slightly and/or a spring steel element may yield while the truss structure is in the collapsed condition. When this truss structure is deployed in space it may not return to its original shape, resulting in dimensional instability which can severely affect the performance of sensitive equipment and optical devices. Other prior art devices added significantly to the overall weight of the system, were not dimensionally stable, and/or were complex, and/or costly.

Figure 8:
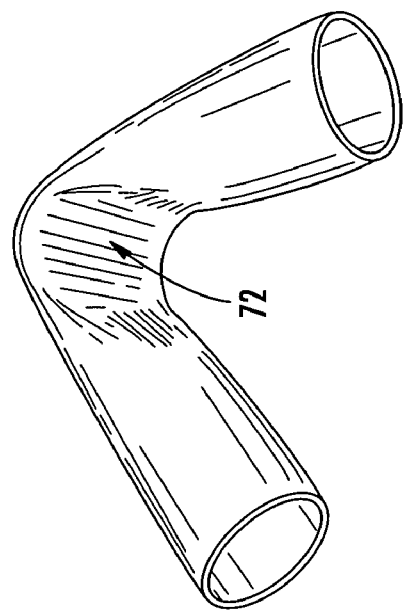
FIG. 8 is a schematic view of the foldable member shown in FIGS. 6 and 7 in a folded position.

In contrast, the subject invention solves these problems in part by a foldable member with a hinge preferably constructed of the same material as the member. In one example, foldable member 60, FIG. 6, includes tube 62 having at least one predetermined hinge area 64. Hinge area 64 includes opposing, elongated slots 66 and 67 (see FIG. 7) forming separate longitudinal strips 70 and 72 of material between the slots. These strips 70 and 72 fold when subjected to localized buckling forces as shown in FIG. 8, thereby allowing the member to fold at the hinge area about axis 74, FIG. 7. "Slots" as used herein means openings, slits, and cuts of any configuration.

Member 60 is dimensional stable and extremely reliable. In addition, by tailoring the material of tube 62, the thermal expansion and/or conductivity of member 60 can be precisely tailored to meet various performance requirements. At the same time, member 60 is sufficiently strong with respect to torsion, shear, and buckling for numerous applications.

Figure 7:
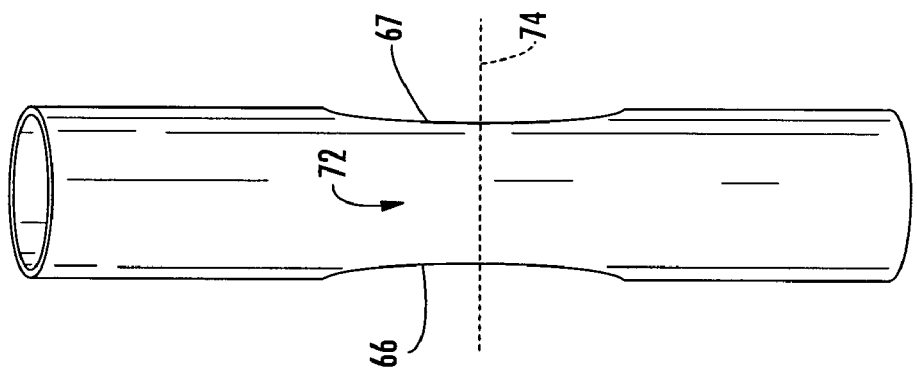
FIG. 7 is a front elevational view of the foldable member shown in FIG. 6.
Figure 6:
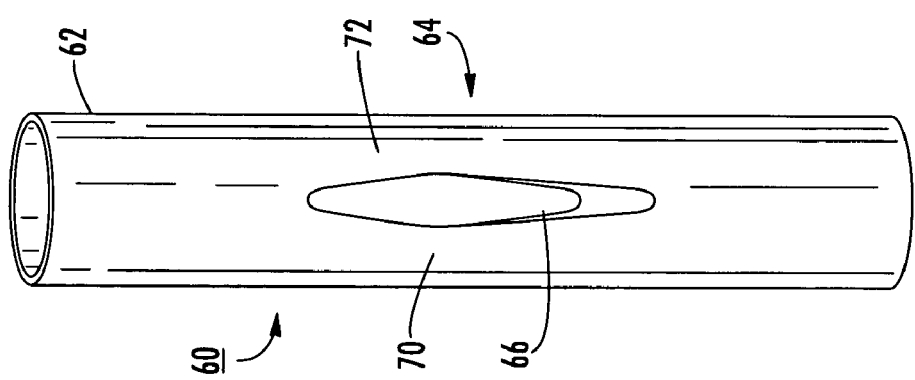
FIG. 6 is a side elevational view of the foldable member of the subject invention.

Slots 66 and 67, as shown in FIGS. 6 and 7, are diametrically opposing but this is not a limitation of the present invention. For example, in the embodiment shown in FIG. 9, there are three opposing elongated slots 90, 92, and 94 and three opposing longitudinal strips 96, 98, and 100 (see also FIG. 10). Longitudinal strip 96 is diametrically opposed to elongated slot 94, longitudinal strip 98 is diametrically opposed to slot 90 and longitudinal slot 100 diametrically opposes slot 92. Therefore, the slots are spaced around the circumference of the tube in a generally opposing configuration, but a given slot may not diametrically oppose another slot even if there are only two slots. Also, although the slots are each shown to be of the same construction, this is not a limitation of the present invention as the length and opening width of the slots at a given hinge area may be different depending on the specific design. Furthermore, the slots may vary from a mere slit to a wide elongated opening. For example, slots 66 and 67, FIGS. 6 and 7, are simply a 4 inch long formed in a 1¾ inch tube. Slots 90, 92, and 94, FIG. 9, on the other hand, are elliptically shaped and approximately 11/16 inches wide at their widest point.

As shown in FIG. 1, a given truss member may include a plurality of hinge areas such as hinge areas 16, 18, and 20 along the length of truss member 12. Therefore, any one member may include a number of hinge areas, each hinge area including two or more opposing elongated slots.

Tube 62, FIGS. 6-9 may be made of plastic material such as a polycarbonate material, but polyurethane, Delrin, or nylon tubes may also be constructed. Also, for space applications in particular, composite materials may be used including a braided fiber structure embedded in a resin matrix. In one early example, carbon fibers were braided using a round braider to form a triaxial braid in a tubular shape which was then impregnated with a polycarbonate resin. A thin wall aluminum tube was wrapped in Teflon and over wrapped with a sheet of Lexan material. A triaxial carbon braid was formed over the Lexan sheet and additional layers of Lexan were added over triaxial braid. A combination of pressure and elevated temperature was used to consolidate the Lexan material into the fibers. The slots were then formed in the tube in the desired configuration. The tube may also be made of metal.

When structure 10, FIG. 1 was constructed of 1.5 inch diameter tubes similar to those shown in FIG. 9, it weighed 3.9 lbs. and supported a static load of more than 200 lbs. This 4 ft. tall structure is collapsible to an 11 inch tall folded package. Therefore, a 100 foot long structure could be packaged into a "Delta class" space vehicle for space deployment and would weigh less than 100 lbs. Since material is actually removed from each foldable member when the opposing slots are formed, the resulting structure weighs significantly less than prior art structures constructed of members including spring steel elements 40, 44, and 42, FIG. 4 or prior art structures with mechanical hinges.

In another embodiment, member 120, FIG. 10 includes opposing sets 122 and 124 of elongated slots. Thus, set 122 includes two slots, slot 126 and slot 128 separated by bridge element 130; and set 124 includes two slots, slot 132 and slot 134 separated by bridge element 136. Each slot was about ⅛" wide and about ⅝" long in a 1% inch diameter Lexan tube. Each bridge element was about 3/16 inches long.

In one embodiment, slot 126 is diametrically opposed from slot 132 and slot 128 is diametrically opposed from slot 134 although this is not a limitation of the present invention.

Also, stress relieving member 138 (e.g., a dowel) may be attached to each bridge element 130 and 136 on the inside of the tube for relieving the stress of each bridge member and to prevent them from tearing or cracking when the tube is folded.

The foldable member shown in FIGS. 10 and 11 proved to be generally stronger in and torsion than the members shown in FIGS. 6-9.

By including the hinges of this invention in a longeron twenty feet in length, it may be collapsed to a three foot long package, convenient for storage. A 3-4 inch diameter tube would typically have about a 1/16th inch wall thickness while a 1½ inch diameter tube would typically have a 0.020 inch wall thickness, although many different combinations of wall thickness and diameters are possible over a wide variety of tube lengths and tube materials for specific applications.

The result is a foldable truss member, or longeron, or tube with no moving parts or joints and thus a lighter and more dimensionally stable structure. The hinge means or elements are preferably made of the same material as the tube unlike the spring steel elements of the prior art.

The members shown in FIGS. 6-11 could be a component of truss structure 10, FIG. 1 made of like truss members joined together as shown or instead could be a longeron of a frame or bulkhead or even a solitary boom or portion of an arm or other member.

In addition, the members shown in FIG. 6-11 could be a part of other mechanical structures such as collapsible mobile bridges, erectable civil engineering structures for emergency response and disaster relief, tent poles, police barricades, and the like.

Figure 12:
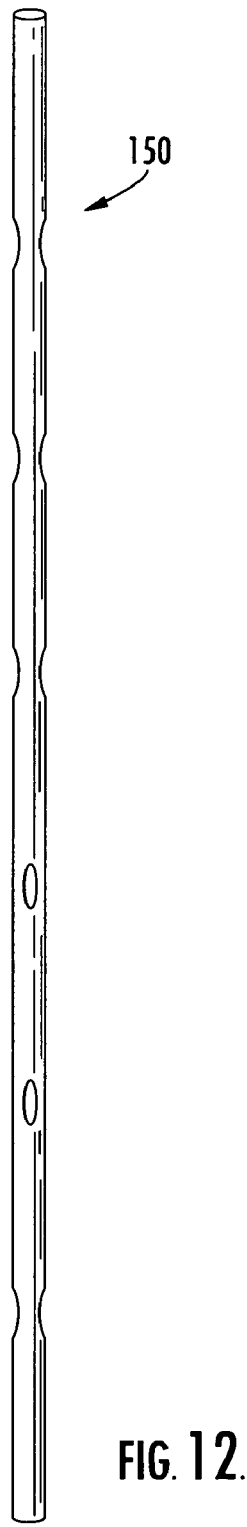
FIG. 12 is a front elevational view of a single elongated foldable member with multiple hinge areas in accordance with this invention.
Figure 13:
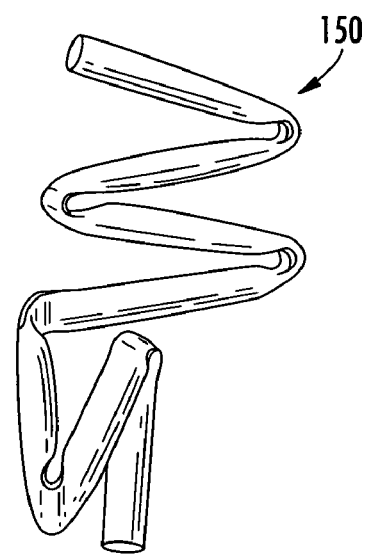
FIG. 13 is a schematic view of the member of FIG. 12 in a folded position.

FIGS. 12 and 13 show foldable structural member 150 with elongated slots placed at different locations to allow the member to be folded at different angles of bend to accommodate unique storage and/or deployment requirements or sequencing.

Figure 14:
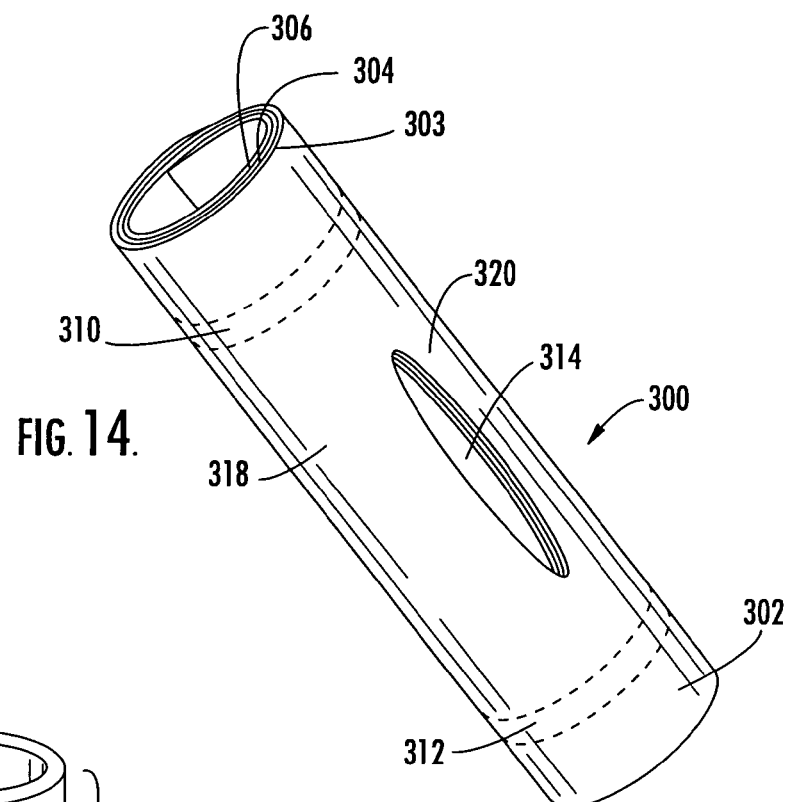
FIG. 14 is a schematic view of another embodiment of a foldable member in accordance with the subject invention.

Foldable member 300, FIG. 14 includes tube 302 made of layers 303, 304, 306, etc. of material, plastic (e.g., Lexan or composite material), for example, formed by wrapping a sheet of the material around itself several perhaps even 20 or more times. An adhesive, for example a double sided tape, may be used to secure the layers of plastic material to each other at selected locations along the length of the tube for example at locations 310 and 312, shown in phantom. If the sheet of material comes off a round roll of stock material, it will have a tendency to roll up into a tube due to memory, an advantageous feature of this embodiment of the subject invention.

As with the other embodiments, slot 314 and an opposing slot (not seen in FIG. 14) is formed through all of layers 303, 304, and 306 forming longitudinal strips of layers of material 318 and 320 which fold when subjected to localized buckling forces. In this embodiment, additional strength is provided by virtue of the many individual columns of tube material.

Figure 15:
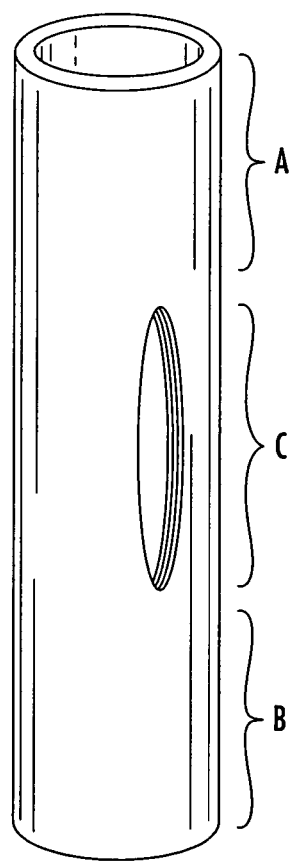
FIG. 15 is a schematic view of still another embodiment of a foldable member in accordance with the subject invention.

In the embodiment shown in FIG. 15, the individual tube layers are laminated to each other in areas A and B but not at hinge area C. As such, the layers of material may be made of plastic or composite materials subjected to conventional lamination processes.

Figure 16:
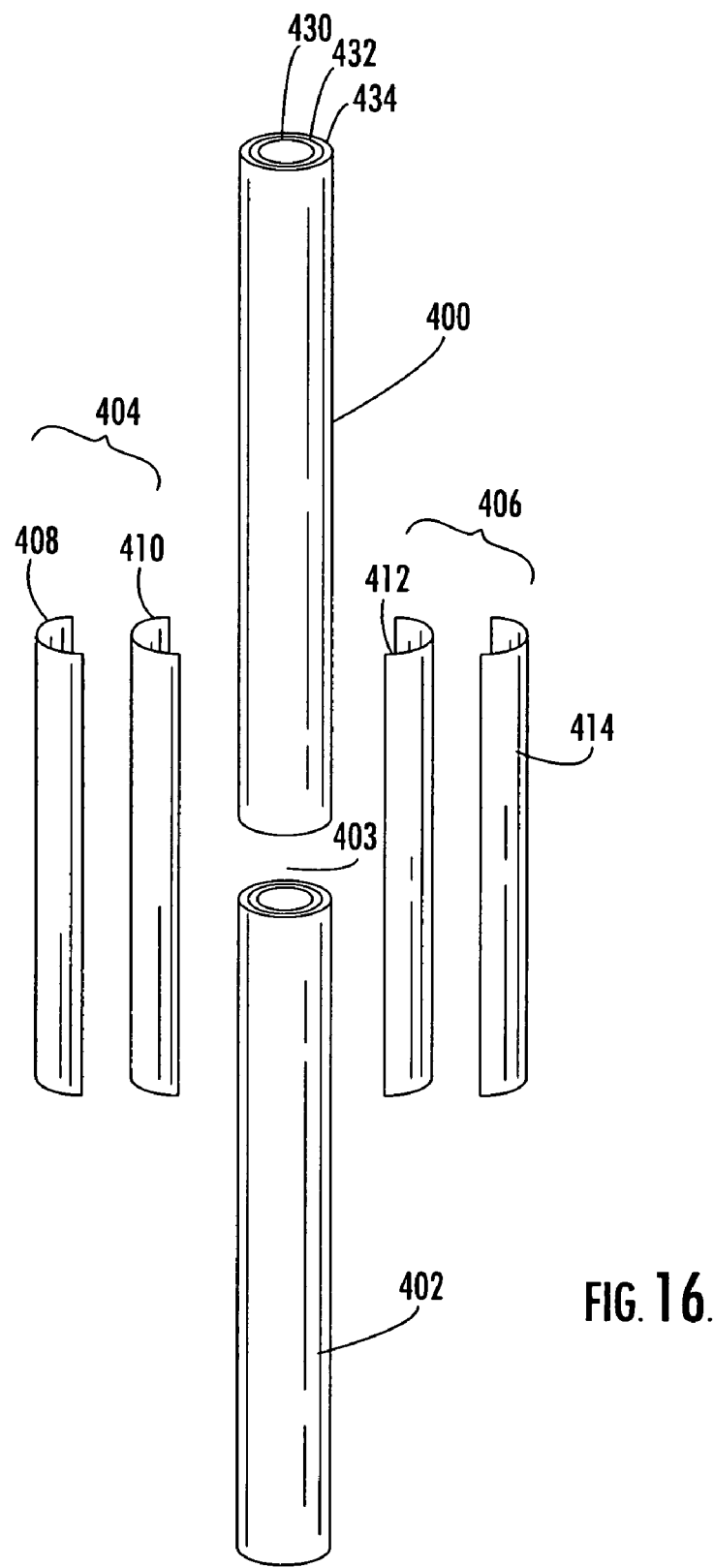
FIG. 16 is a schematic exploded view of still another embodiment of a foldable member in accordance with the subject invention showing the use of conforming members connected between two tube sections.

There is yet another method of forming opposing elongated slots in accordance with this invention to achieve a configuration similar to that of FIG. 14 or 15. FIG. 16 shows two sections 400 and 402 of a composite material tube arranged in an end-to-end manner defining gap 403 therebetween.

One set 404 of C-section member plies 408 and 410 is assembled and ply 408 is bonded or otherwise secured to ply 410 but typically only at the ends thereof. Set 406 of C-section member plies 412 and 414 is likewise assembled. Then, as shown in FIGS. 17A-17B, set 404 is bonded or otherwise secured to one side of tube sections 400 and 402 to bridge the gap therebetween and set 406 is secured to an opposite side of tube sections 400 and 402 to also bridge the gap therebetween.

This construction results in opposing elongated slots such as slot 420 (and a slot, not shown, opposite slot 420) separated by longitudinally running strips of material, i.e., the material of ply set 404 and 406 which fold when subjected to localized buckling forces (See FIG. 17B) and which unfold, typically, automatically, when released.

Figure 17:
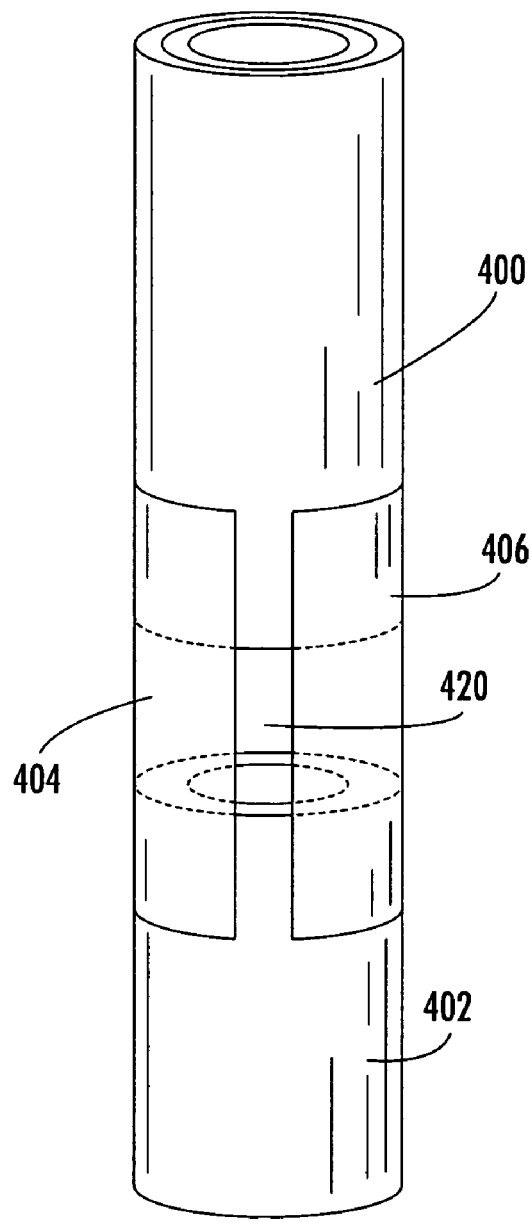
FIG. 17 is a schematic view showing the embodiment of the foldable member of FIG. 16 in the assembled state.

In FIG. 16, only two plies for each set of C-section members are shown for clarity but typically numerous (e.g., 8 or more) plies are used for increased strength and stiffness as shown in FIG. 17B. The C-cross sectional shape is typically obtained by pultrusion techniques. Preferably, the material of plies 408, 410, 412, and 414 are the same as the material of tube sections 402 and 400 although this is not a necessary limitation of the subject invention. In this way, all of the components of FIGS. 16-17 discussed above may be made of composite materials (e.g., carbon/PEEK compositions). In other examples, tube sections 400, 402 and plies 408, 410, 412, and 414 are made of plastic such as Lexan. It is also preferred that the tube sections 400, 402, FIG. 16 each include a plurality of layers or plies 430, 432, 434 as shown for tube section 400. See also FIGS. 14-15.

As with the designs discussed above with reference to FIGS. 6-15, there may be two diametrically opposing slots, three opposing slots, and many hinge areas in a given foldable member.

Figure 18:
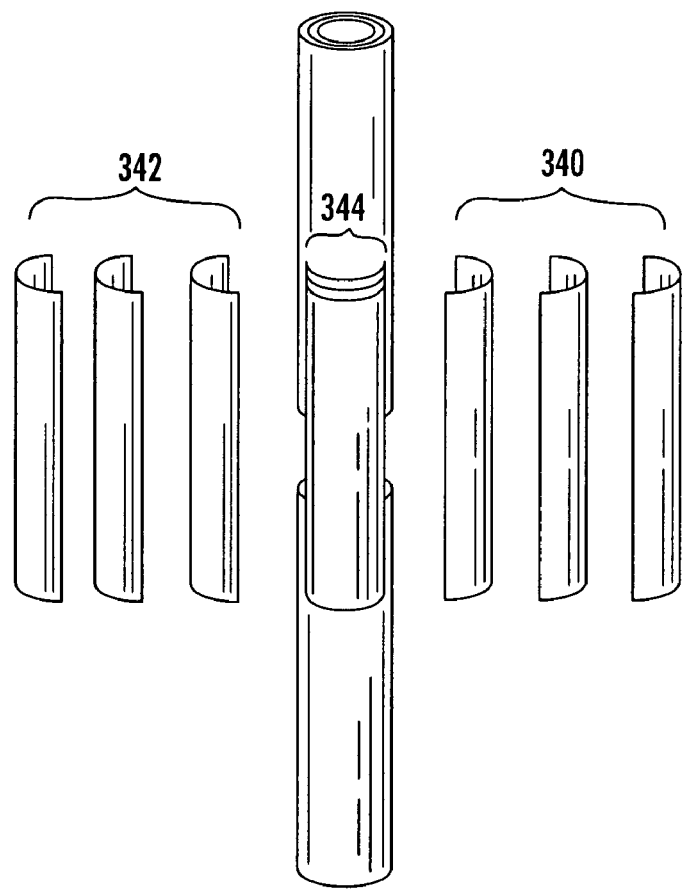
FIG. 18 is a schematic partially exploded view showing another embodiment of the subject invention.
Figure 19:
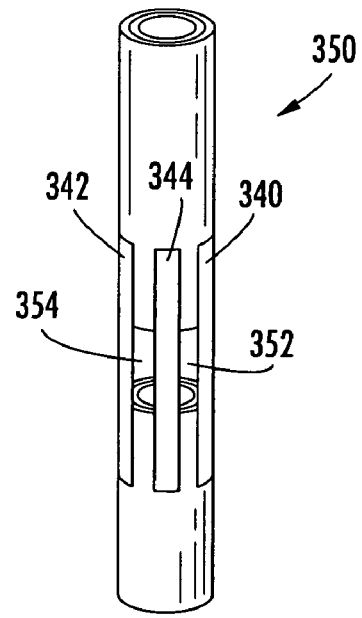
FIG. 19 is a schematic view showing an assembled foldable member in accordance with an embodiment shown in FIG. 18.

For example, as shown in FIGS. 18-19, there are three sets 340, 342, 344 of conforming members each made of three plies as shown and another set (not shown) on the side opposite ply set 344 resulting in foldable member 350, FIG. 19 with four slots two of which are shown at 352 and 354 in FIG. 19.

Figure 20:
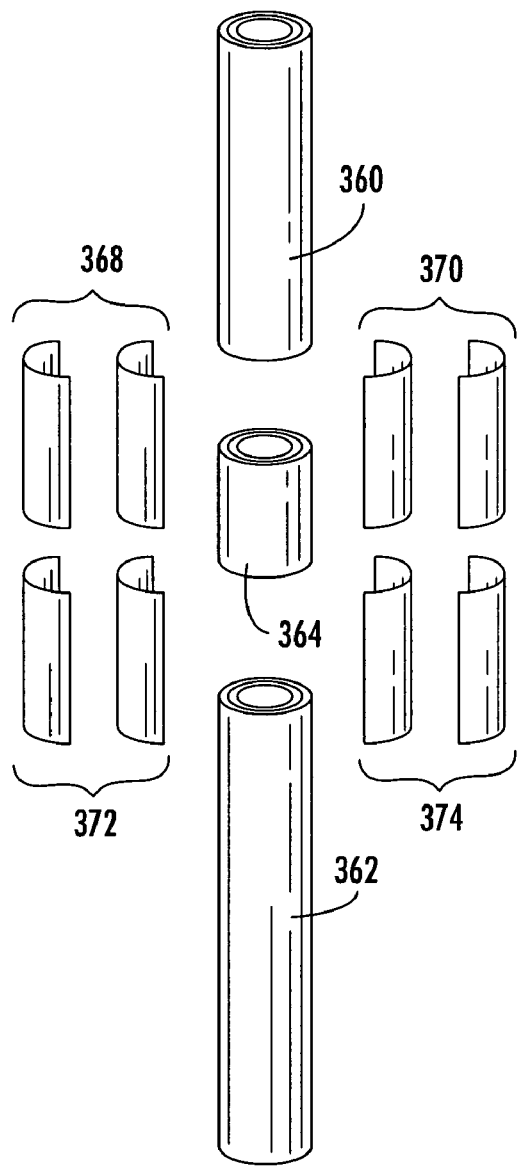
FIG. 20 is a schematic partially exploded view of still another embodiment of the foldable member of this invention.
Figure 21:
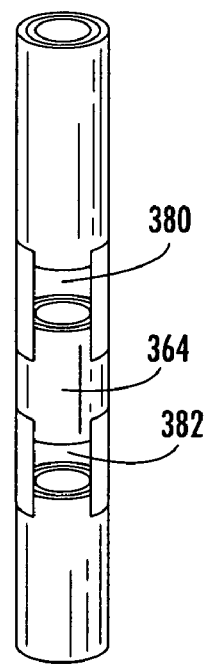
FIG. 21 is a schematic view showing an assembled foldable member in accordance with the embodiment of FIG. 20.

The design of FIGS. 10-11 wherein there are sets of longitudinally adjacent opposing slots may be effected by tube sections 360 and 362, FIGS. 20-21 and intermediate tube section 364. Sets 368 and 370 of conforming C-section plies secure the bottom of tube section 360 to the intermediate bridge element section 364 while sets 372 and 374 secure the top of tube section 362 to intermediate section 364 to form a set of longitudinally adjacent slots 380 and 382, FIG. 21 separated by bridge element 364 and a similar set of circumferentially located axially adjacent slots (not shown) opposite slot set 380, 382. As shown for ply 371, it may be preferrential that select or even all the individual plies of sets 368 and 370 be continuous.

In accordance with the designs and method of FIGS. 16-21, the number, thickness, length, width and material used for the conforming plies which ultimately form the slots can be tailored to the specific implementation. Similar variations exist with the respect to the material used for, the length and diameter of, and the number of plies or layers of the tube sections.

The curvature of the cross section of each member relative to its thickness is governed by the tensile and compression yield strength of the material. The maximum amount of stress is seen by the material at the surface of the cross section. For this reason, the surface of the cross section should be as free from defects as possible.

The amount of strain seen is given as:

$$\sigma = \frac{t}{2R} \quad (1)$$

where t is the thickness of the cross-section and R and the radius of curvature either of the curved cross-section that is to be flattened or of the cross-section to which a flat element is to be curved.

For completely elastic storage, the value of the strain may be selected to be below the yield strength of the material in the direction of the curvature.

In the case of shape memory or super-elastic materials, the strain value is selected so that the value $$\frac{t}{2R}$$

is below the limit of elongation and compression recovery of those materials.

For precision applications, these values of t and R should be selected so the strain $$\frac{t}{2R}$$

is sufficiently below the yield strain so that creep, stress relaxation and micro-yield are reduced to acceptable limits. The acceptable limits are defined by the material section and the specific needs of the application.

Figure 22:
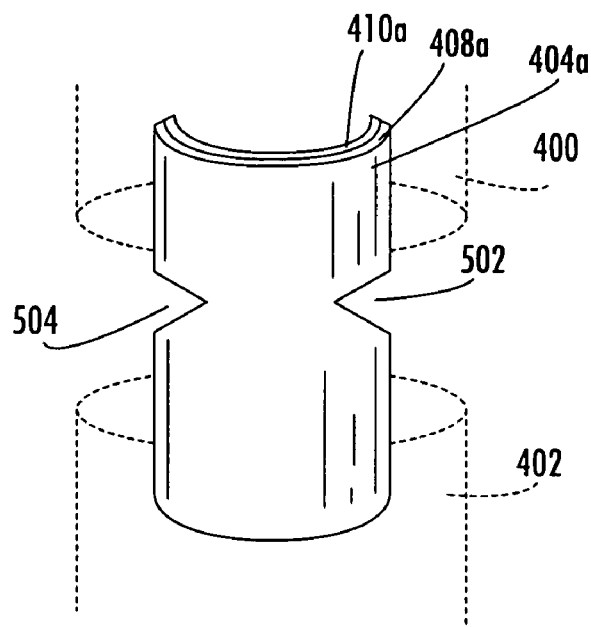
FIGS. 22-23 are schematic views showing conforming members in accordance with this invention having neck down regions.
Figure 23:
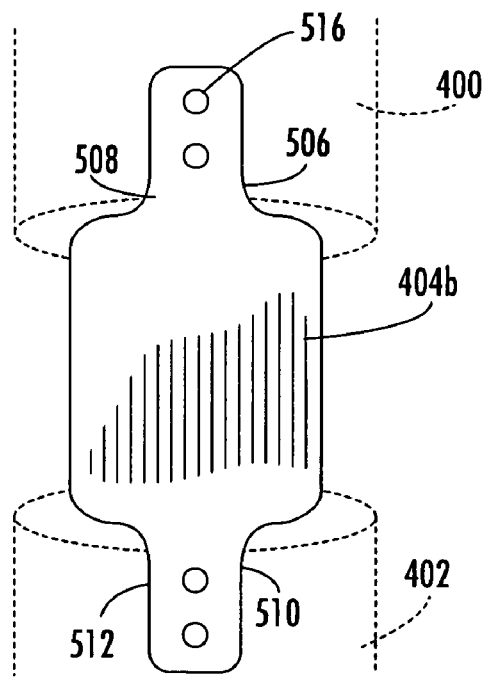

In FIG. 22, set 404a of conforming members 410a and 408a between tube sections 400 and 402 includes neck down regions 502, 504 designed to control the location of the folding of the conforming members and to prevent delamination or deformation of the conforming members. The same result is shown in FIG. 23 by neck down regions 506, 508, 510, and 512. Preferably, it is only at these neck down regions that the individual conforming members are adhered together and the set of conforming members are then adhered and optionally fastened using fastener 516 to the tube sections at the neck down region.

Figure 24:
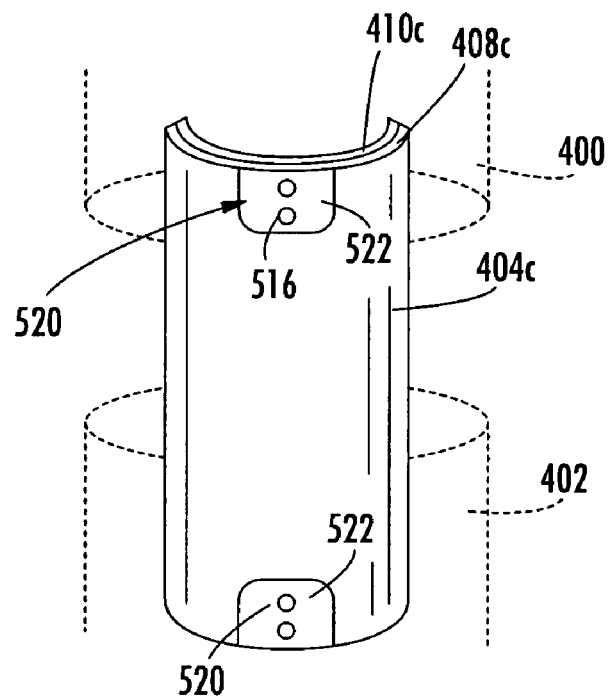
FIG. 24 is a schematic view showing one method of securing the conforming members to the two tube sections in accordance with this invention.
Figure 25:
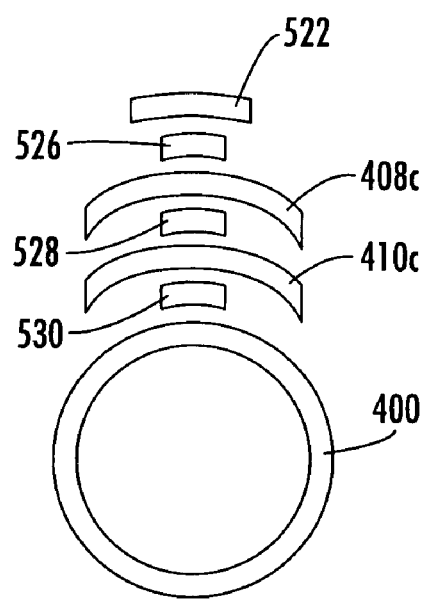
FIG. 25 is a cross sectional view of a portion of FIG. 24.

In FIG. 24, conforming members 410c and 408c are secured together only at central end regions 520 where they attached to the tube sections 400, 402 and central end regions 520 is capped with plate 522, which may be made of metal, through which fastener 516 extends. In cross section, film adhesive 526, as shown in FIG. 25, centrally secures cap 522 to conforming member 408c, film adhesive 528 centrally secures conforming member 408c to conforming member 410c and film adhesive layer 530 centrally secures conforming member 410c to the outer wall of tube section 400. Typically, tube section 400 includes multiple plies or layers as shown in FIGS. 14 and 16.

Figure 26:
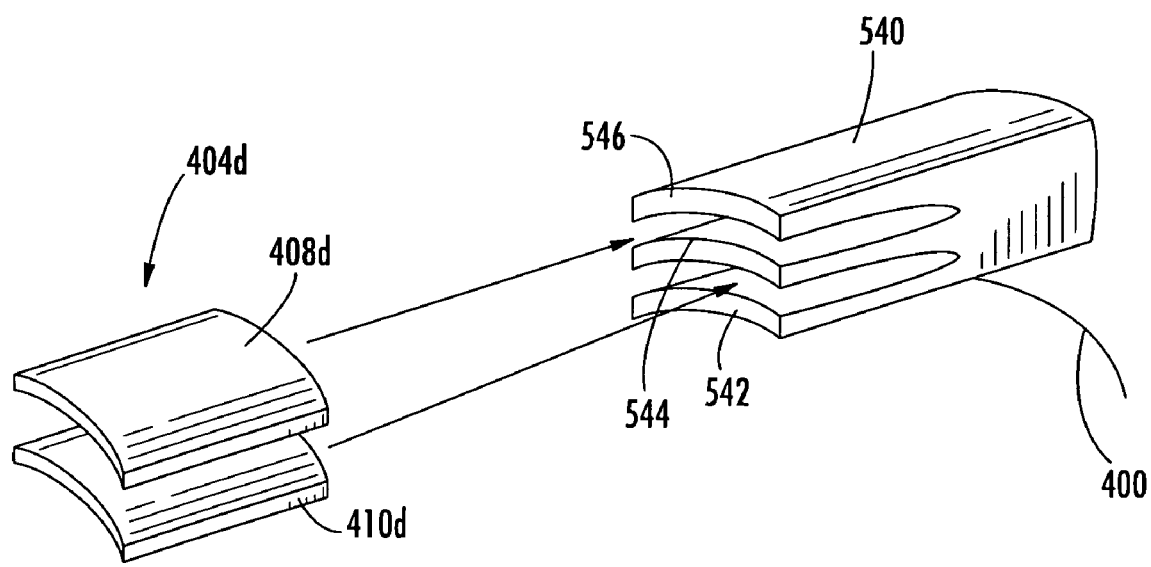
FIG. 26 is a schematic view showing the use of an intermediate member used to join the conforming members of this invention to a tube section.

In FIG. 26, intermediate rigid (e.g., metal) member 540 is used and has spaced fingers 542, 544, and 546. One end of conforming member 410d is received and secured (e.g., adhered) between fingers 542 and 544 and one end of conforming member 408d is secured between fingers 546 and 544. Intermediate member 540 is then attached to the outer wall of tube section 400. A similar rigid member, not shown, is secured between the adjacent spaced tube section and the opposite ends of conforming members 408*d* and 410*d*. In still another embodiment, intermediate member fingers 542, 544, and 546 are integral layers of the tube sections themselves.

Figure 27:
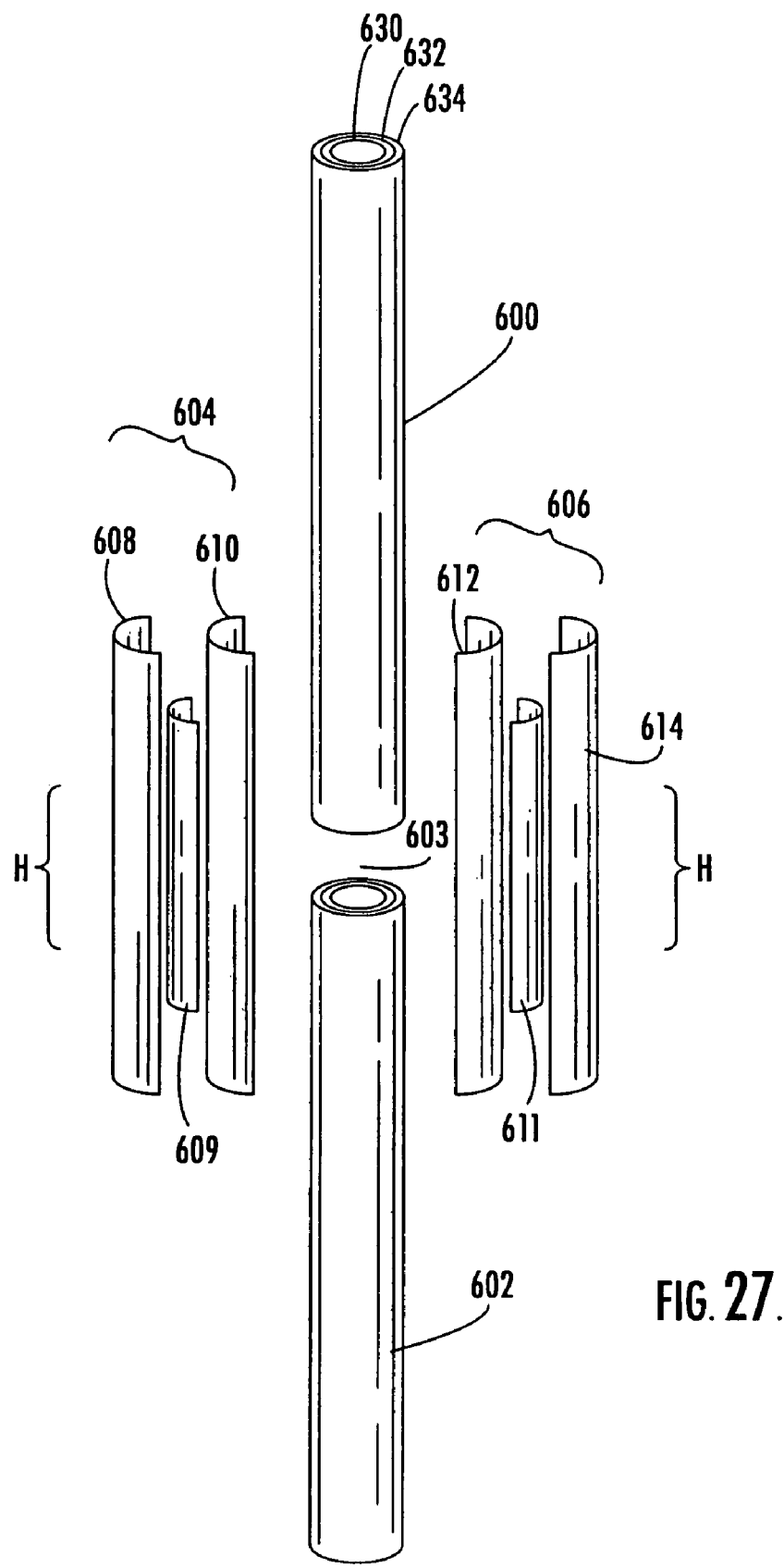
FIG. 27 is a schematic exploded view of an embodiment of the subject invention featuring a deployment rate damped flexible hinge in accordance with the subject invention.

One flexible hinge in accordance with the subject invention includes a first set of plies 604 and a second set of plies 606 as shown in FIG. 27 attached to members 600 and 602. Typically, both sets of plies are bendable inward and outward but, at the very least, ply set 604, for example is bendable outward and ply set 606 is bendable inward. The flexible hinge shown in FIG. 27 may include a plurality of plies, such as plies 608, 610, 612, and 614. In the embodiment shown, ply set 604 includes individual plies 608 and 610, but typically there are more than two plies per ply set. Also, ply set 606 in FIG. 27 includes two plies 612 and 614 for illustration purposes only, as there are typically more than two plies per ply set. In FIG. 27, H indicates the hinge area where the first set of plies 604 bends outward and the second set of plies 606 bends inward in order to fold member 600 down adjacent member 602. Members 600 and 602 may be composite material tubes each made of a number of layers 630, 632, and 634 as shown for tube member 600 but, in other embodiments, can be tubes or members of any configuration or material. In accordance with the subject invention, damping material 609 is disposed between plies 608 and 610 of ply set 604, and damping material 611 is disposed between plies 612 and 614 of ply set 606 at least at the hinge area H thereof to damp the rate of deployment of the hinge. If there are additional plies in each ply set, additional damping material may be disposed between each pair of adjacent plies at the hinge area H as required. It is not a necessary limitation of the subject invention, however, that there be damping material between each pair of adjacent plies of each ply set. Typically, the plies are made of composite material as discussed above, and plies 608, 610, 612 and 614 curve inwardly to conform to members 600 and 602.

The damping material 609, 611 may be solid such as a sheet of rubberized elastomer. In alternative embodiments, damping material 609 and 611 may be a liquid when applied. Typically, the damping material used is viscous and/or visco-elastic. Various releasable epoxy may be used for damping material 609 and 611. Further, adhesive layers may be disposed between the damping material and the adjacent plies.

As shown in FIG. 28, first ply set 650 and second ply set 652, each including a plurality of plies, are configured such that ply set 650 bends inward and ply set 652 bends outward at hinge area H. This is shown more clearly in FIG. 29. Ply sets 650 and 652 are attached together on opposite sides of hinge area H at locations 660 and 662 where they couple to members 664 and 666.

In one embodiment, it is possible to form ply sets 650 and 652 by forming a composite tube member made of multiple plies of composite material and damping material and forming elongated slots therethrough partially along the length thereof, especially at hinge area H. In FIG. 28, a cut 670 is shown completely through the tube member, and there is a similar cut diametrically opposite cut 670. These two cuts together form first set of plies 650 and second set of plies 652. In other embodiments, the configurations shown in FIGS. 6-26 are used.

The damping material disposed between the individual plies at hinge area H results in a lighter and more dimensionally stable passively damped strain energy hinge. The viscous layers are typically inserted between the structural layers of the flexing hinge material of ply sets 650 and 652. The relative motion of the structural layers during folding shear the layers of visco-elastic material and over time the viscous material flows and reaches an equilibrium state. Once equilibrated, the viscous material resists the elastic motion back to the original structurally deployed state. When the restraints are released, the visco-elastic flow controls the rate of deployment by resisting the force of the strain energy hinge elements and then viscously flowing into position. The visco-elastic material provides the rate control for the deployment from the folded position shown in FIG. 29 to the deployed position shown in FIG. 28. By tailoring the amount, type, and location of the material between the plies at hinge area H, the rate of deployment can be controlled for a wide range of applications. It is preferred that the damping material not extend out of the range of hinge area H. It is also preferred that the damping material not be disposed between the first and second ply sets.

Figure 30A:
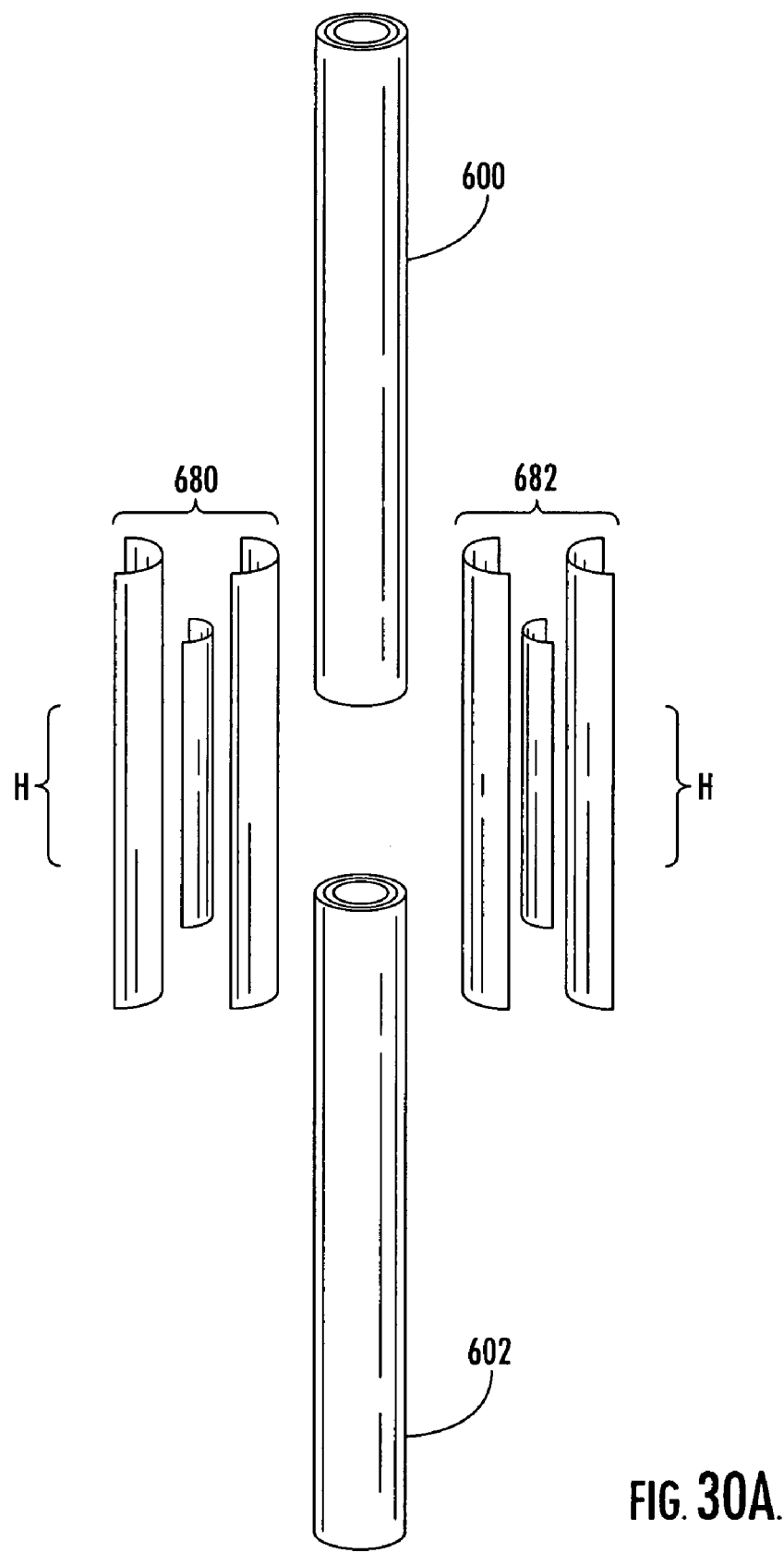
FIG. 30A-C are schematic exploded views of further embodiments of the flexible hinge of FIG. 27.
Figure 30B:
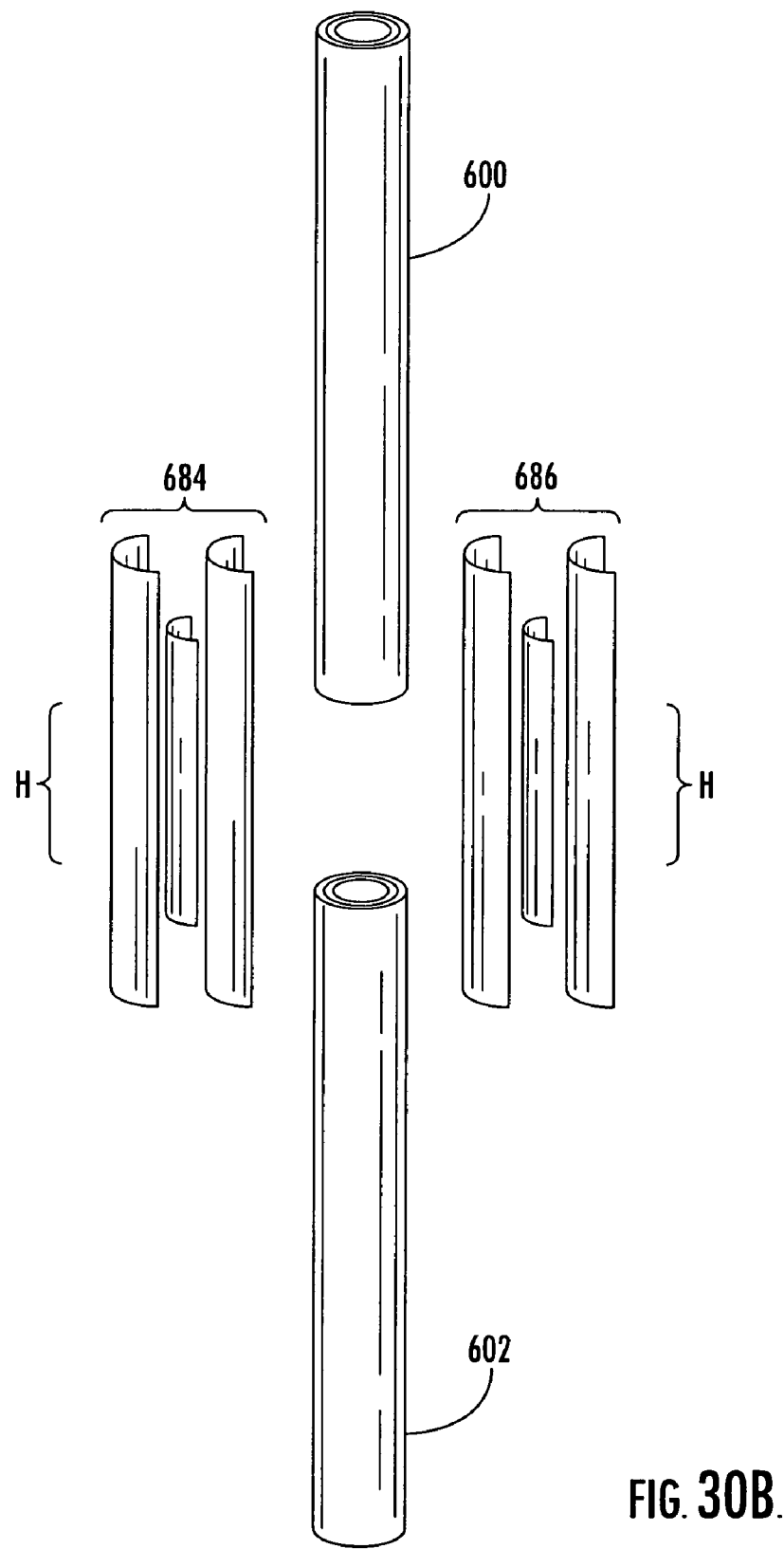
Figure 30C:
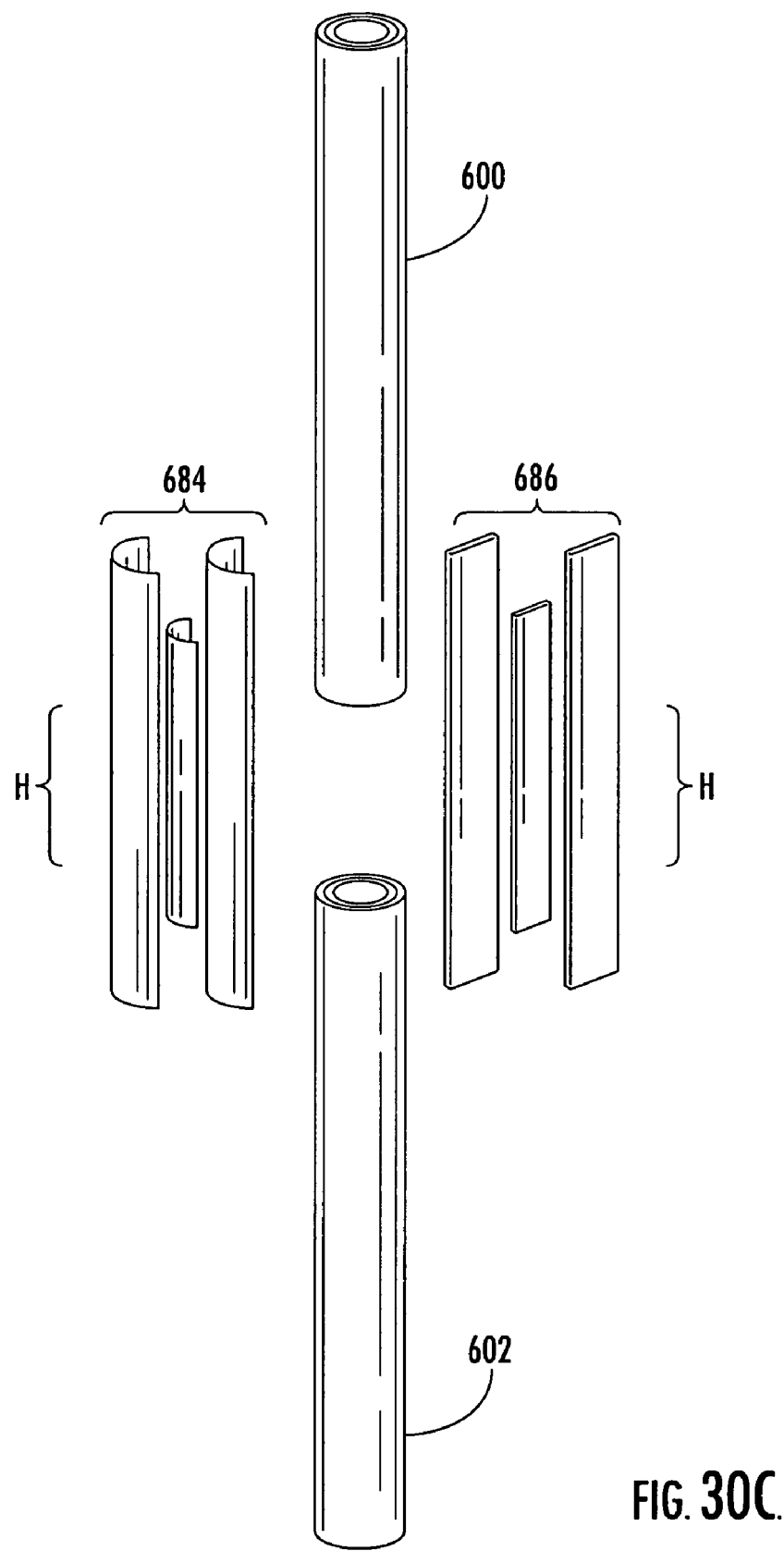

Although the first and second ply sets of FIGS. 27-29 are shown curved inwardly towards each other, this is not a necessary limitation of the invention. FIG. 30A shows an alternative embodiment in which ply sets 680, 682 are curved away from each other, while FIG. 30B shows an alternative embodiment in which ply sets 684, 686 are curved in the same direction. Additionally, one or both of the ply sets can be flat as shown by ply set 688 in FIG. 30C.

Figure 31:
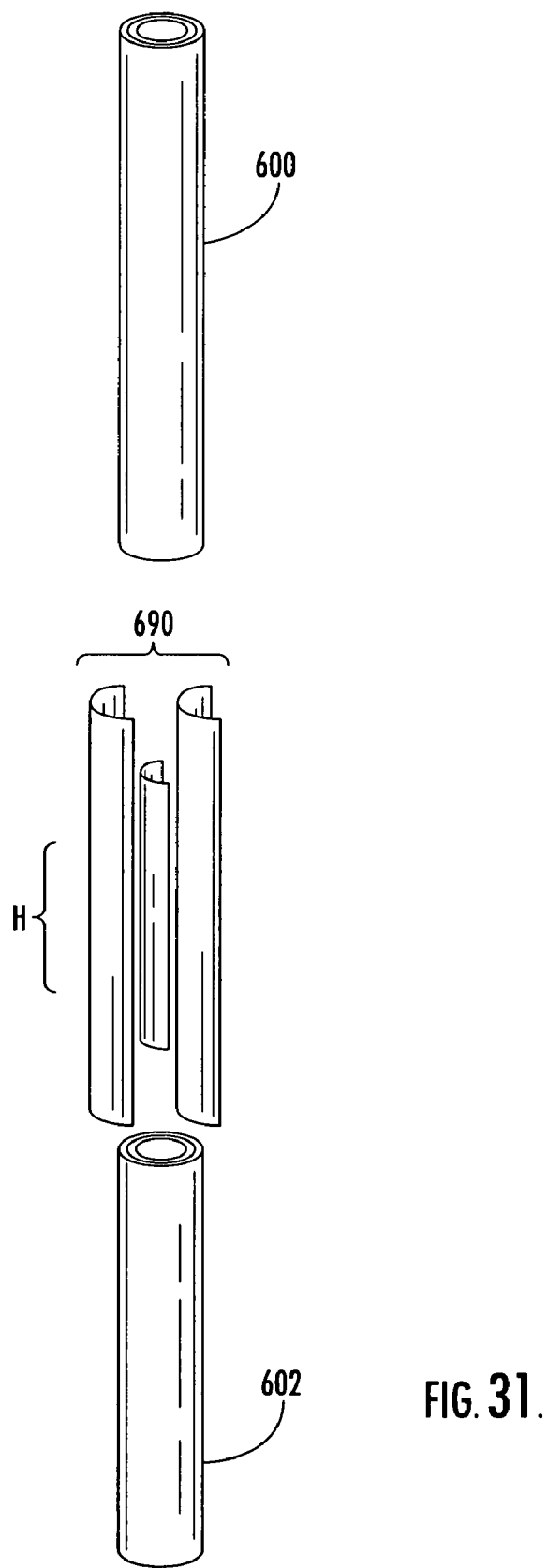
FIG. 31 is a schematic exploded view showing another embodiment of the subject invention.
Figure 32:
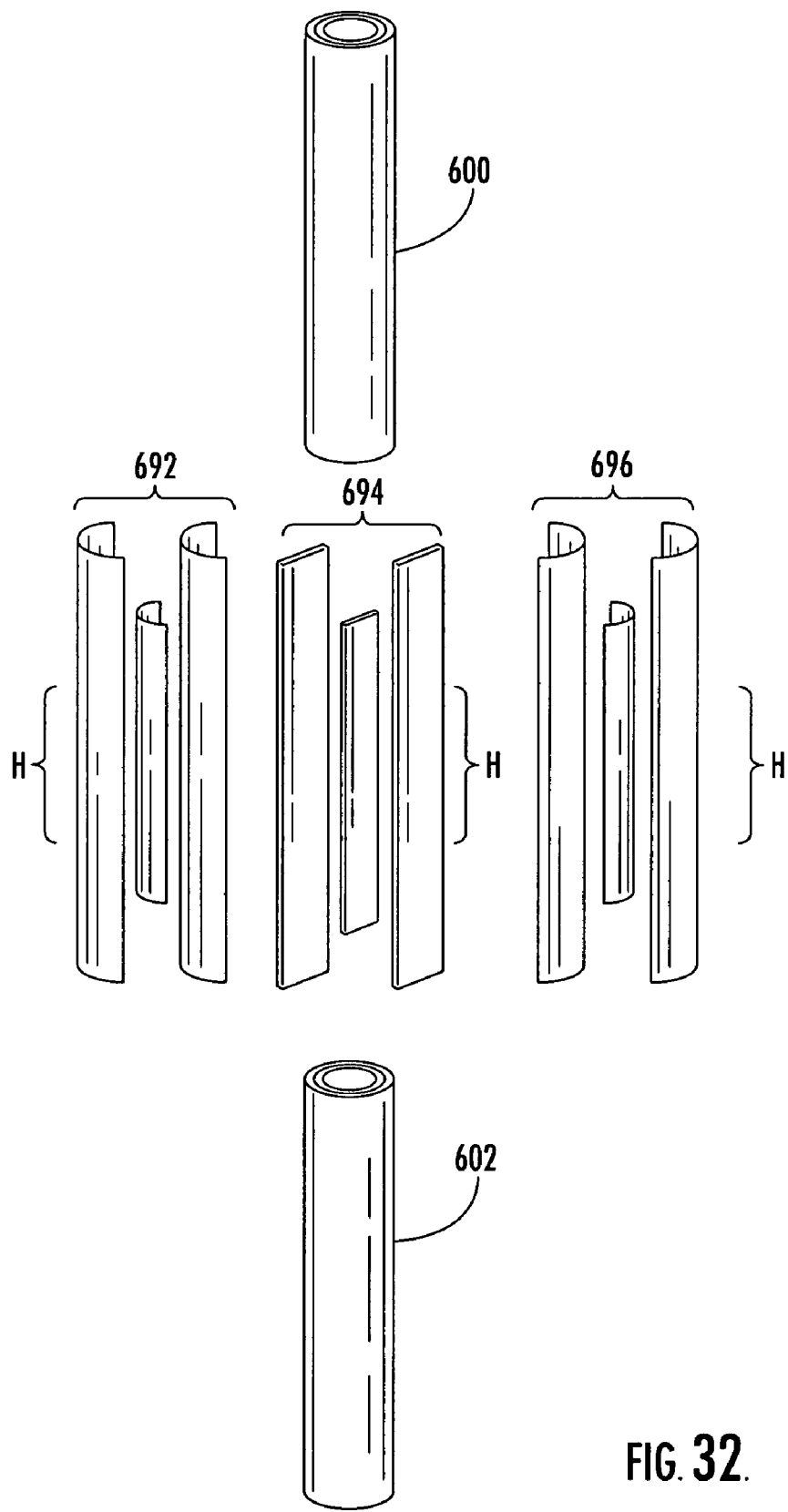
FIG. 32 is a schematic exploded view of still another embodiment of the subject invention.

Further, although the embodiments shown in FIGS. 27-30C include two ply sets, this is not a necessary limitation of the invention. The flexible hinge may include any number of ply sets, including one ply set or a plurality of ply sets. As shown in FIG. 31, the flexible hinge may include a plurality of plies 690. Alternatively, the flexible hinge may include more than two ply sets. In FIG. 32, the flexible hinge is shown with a plurality of ply sets, such as first ply set 692, second ply set 694, and third ply set 696. The curvature or flatness shown for ply sets 690, 692, 694, and 696 in FIGS. 31-32 is for illustration purposes only, as any combination of ply sets shown in FIGS. 30A-C can be used in the embodiments shown in FIGS. 31-32.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

What is claimed is:

1. A self-driving and self-locking foldable member structure comprising:
    a first member;
    a second member;
    a first plurality of plies in a first stack all interconnecting with and secured on their ends to the first and second members and bending outward;
    at least a second plurality of plies in a second stack opposing the first stack, the plies of the second stack all interconnecting with and secured on their ends to the first and second members and bending inward against and in physical contact with the first stack;
    all the plies of the first and second stacks at their ends conforming to and joining to an outside surface of the first and second members;

the first and second stacks defining a hinge area;

damping material between select plies of the first and/or second stack, the damping material limited to the hinge area; and the plies of each stack foldable and free to move with respect to each other and buckle in different places when folded and biased to unfold and self-lock.

2. The foldable structure of claim 1 in which all of the plies are made of a composite material.

3. The foldable member of claim 1 in which all of the plies of the first plurality of plies curve outwardly and all the plies of the second plurality of plies curve outwardly.

4. A self-driving and self-locking foldable member structure comprising:

a first member;

a second member;

a first stack including a first plurality of plies curved outwardly all interconnecting with and secured on their ends to the first and second members and bending outward;

at least a second stack including second plurality of plies curved outwardly and spaced from the first stack, the plies of the second stack all interconnecting with and secured on their ends to the first and second members and bending inward against and in physical contact with the first stack;

the first and second stacks defining a hinge area, damping material between select plies of the first and/or second plurality of plies and limited to the hinge area; and the plies of each plurality of plies foldable and free to move with respect to each other and buckle in different places when folded and biased to unfold and self-lock.

* * * * *